United States Patent [19]

Yamamoto et al.

[11] Patent Number: 4,763,211
[45] Date of Patent: Aug. 9, 1988

[54] FLOPPY DISC DRIVE CONTROL CIRCUIT SECTION SUBSTRATE

[75] Inventors: Kanji Yamamoto; Isao Yamazaki, both of Hitachi, Japan

[73] Assignee: Hitachi, Ltd., Tokyo, Japan

[21] Appl. No.: 769,320

[22] Filed: Aug. 26, 1985

[30] Foreign Application Priority Data

Sep. 5, 1984 [JP] Japan .................. 59-184653

[51] Int. Cl.[4] .......................................... G11B 5/012
[52] U.S. Cl. ...................................................... 360/97
[58] Field of Search ................... 360/97–99, 360/86

[56] References Cited

U.S. PATENT DOCUMENTS 3,912,278 10/1975 Teutsch .................................. 360/97
4,568,988 2/1986 McGinlay et al. .................... 360/78
4,639,863 1/1987 Harrison ............................ 360/97 X

FOREIGN PATENT DOCUMENTS 0067901 5/1980 Japan .................................. 360/137
0090274 5/1984 Japan .
2132807 7/1984 United Kingdom .

Primary Examiner—John H. Wolff
Assistant Examiner—David J. Severin
Attorney, Agent, or Firm—Antonelli, Terry & Wands

[57] ABSTRACT

A floppy disc apparatus has a single printed wiring board mounting thereon a control circuit section including therein an overall control circuit and write circuit section, a head switching circuit and reproduction circuit section, and a motor drive circuit section. The motor drive circuit section is disposed in opposite relation to the overall control circuit and write circuit section and the head switching circuit and reprodcution circuit section with the drive motor therebetween. The overall control circuit and write circuit section and the head switching circuit and reproduction circuit section are disposed in successive relation with the head switching circuit and reproduction circuit section disposed adjacent to a connector for connecting lead wires of a head mechanism. Due to such separate arrangement of the driving circuit section and the signal circuit section, the present invention permits the control circuit section to be mounted on a single printed wiring board with very excellent noise resistance, thus resulting in the effects of improving noise resistance and the assembly efficiency.

11 Claims, 3 Drawing Sheets

FLOPPY DISC DRIVE CONTROL CIRCUIT SECTION SUBSTRATE

BACKGROUND OF THE INVENTION

1. Field of the Invention

The present invention relates to a floppy disc drive apparatus, and more particularly to a board configuration or a substrate structure of the control circuit section for the floppy disc drive apparatus.

2. Description of the Prior Art

There is known a control circuit section for floppy disc drive apparatus that comprises an upper printed wiring board mounting thereon a circuit adapted to process signals in association with a head mechanism and a circuit adapted to drive a stepping motor, a lower printed wiring board mounting thereon an overall control circuit, a card edge terminal and a power socket, and a drive motor board mounting thereon a drive motor driving circuit. (Japanese Patent Laid-Open specification No. 59-90274).

With such a configuration or structure, the printed wiring boards separated for separate functions are less subject to adverse effects due to mutual interference. But the increased number of printed wiring boards results in an increase of the number of connection lead wires between the printed wiring boards and the number of parts, thereby reducing noise resistance, reliability as well as the assembly efficiency.

SUMMARY OF THE INVENTION

An object of the present invention is to provide a floppy disc apparatus wherein a noise resistance can be improved.

Another object of the present invention is to provide a floppy disc apparatus wherein the assembly efficiency of a printed wiring board can be raised.

A further object of the present invention is to provide a floppy disc apparatus wherein length of wiring and laying of a contol circuit section can be shortened.

A still further object of the present invention is provide a floppy disc apparatus wherein reliability and operability of a control circuit section can be improved.

The present invention provides a floppy disc apparatus comprising a drive motor for driving a floppy disc; a head mechanism for reading/writing data; a stepping motor for moving the head mechanism; a card edge terminal connected to a system for transmitting signals to and from the system; a power socket for receiving source power; a connector for connecting of lead wires of the head mechanism; a control circuit section for executing various types of control and signal processing; and a printed wiring board mounting thereon the control circuit section, the card edge terminal, the power socket and the connector being formed or mounted on the printed wiring board, the control circuit section including therein an overall control circuit and write circuit section, a head switching circuit and reproduction circuit section, and a motor drive circuit section, wherein the overall control circuit and write section, the head switching circuit and reproduction circuit section and the motor drive circuit section are mounted on the printed wiring board formed of a single printed wiring board, and further the motor drive circuit section is disposed in opposite relation to the overall control circuit and write circuit section and the head switching circuit and reproduction circuit section with the drive motor therebetween.

The floppy disc apparatus of the present invention features a single board mounting thereon an entire control circuit section, and an integration of circuits to reduce the number of parts and also in separate arrangement of a noise driving circuit section and a signal circuit section.

Due to such separate arrangement of the driving circuit section and the signal circuit section, the present invention permits the control circuit section to be mounted on a single printed wiring board with very excellent noise resistance, thus resulting in the effects of improving noise resistance and the assembly efficiency.

DETAILED DESCRIPTION OF THE PREFERRED EMBODIMENTS

Figure 1:
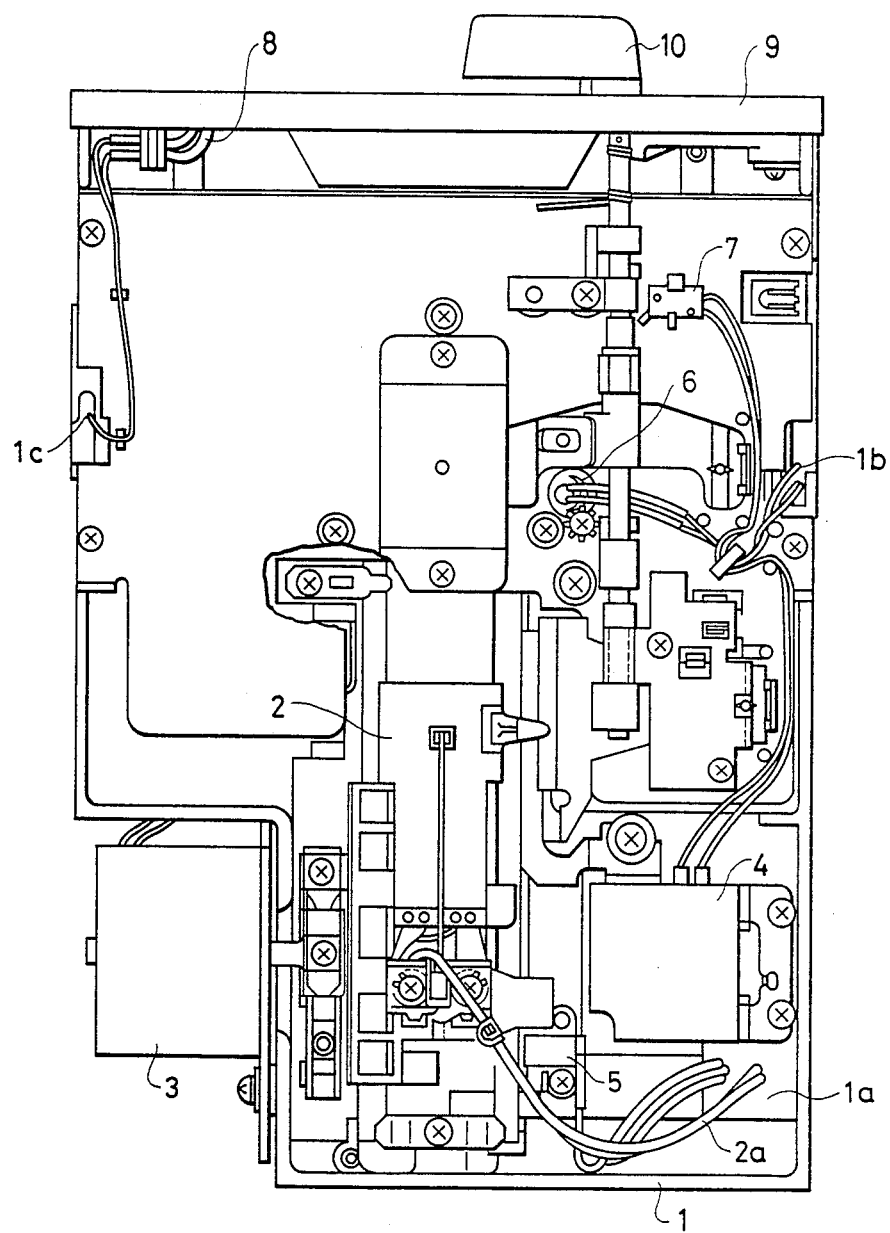
FIG. 1 is a plan view of a floppy disc drive apparatus in the present invention.
Figure 2:
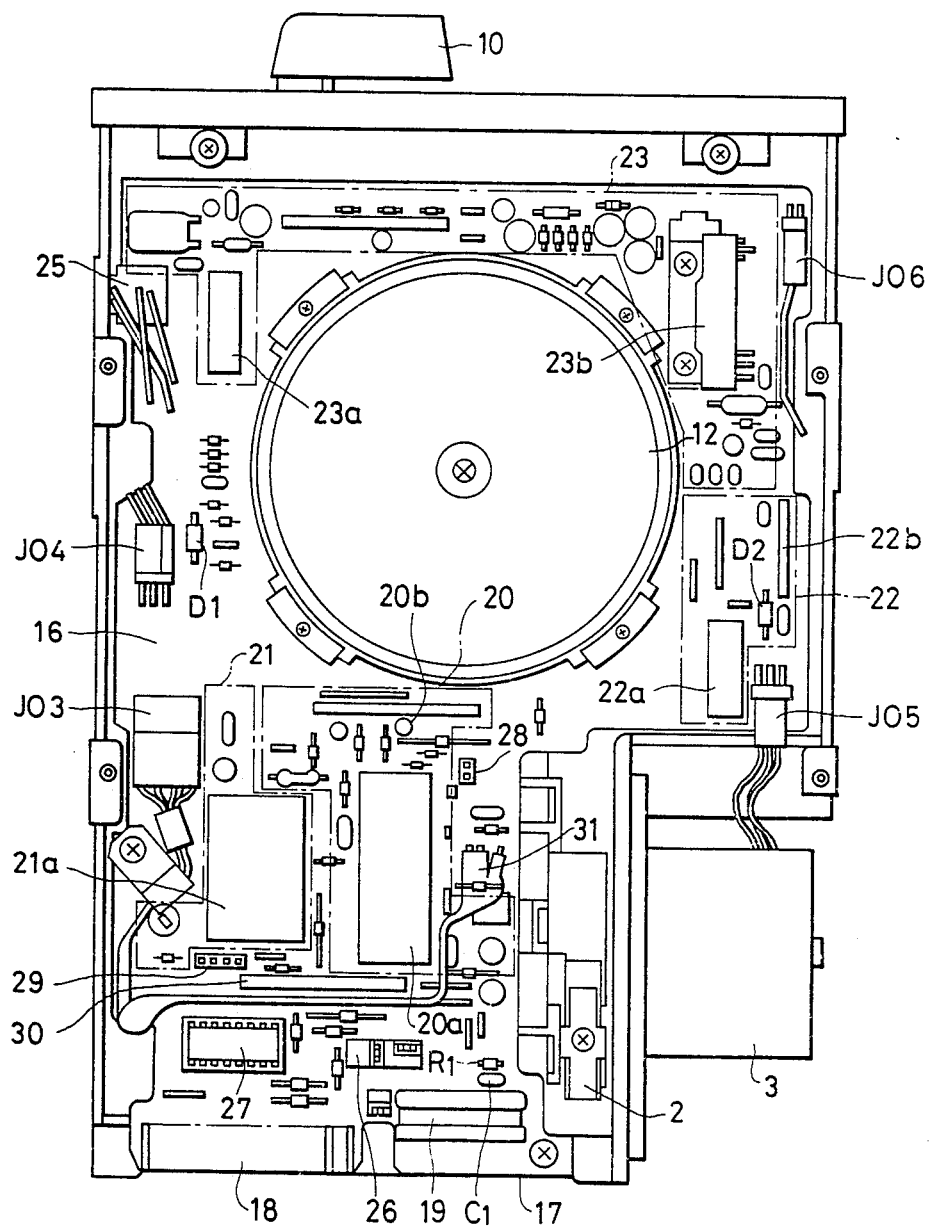
FIG. 2 is a bottom view of a floppy disc drive apparatus in the present invention.
Figure 3:
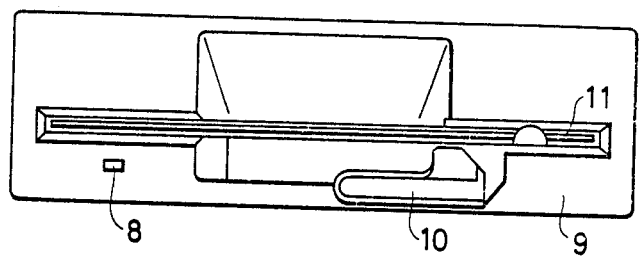
FIG. 3 is a front view of a floppy disc drive apparatus in the present invention.
Figure 4:
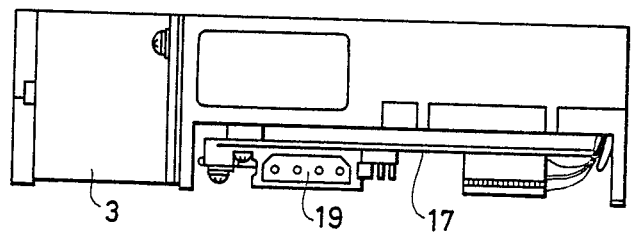
FIG. 4 is a rear view of a floppy disc drive apparatus in the present invention.

Hereinafter, one embodiment of the present invention will be described in detail with reference to the drawings.

A head mechanism 2 for reading/writing data coupled with a stepping motor 3 for moving the head mechanism 2 is assembled onto a chassis 1. A head load mechanism 4 which operates the head mechanism 2 to push against a recording surface of a floppy disc 11 and a drive motor 12 for driving the floppy disc 11 are assembled onto the chassis 1 respectively.

A zero track sensor 5 for initializing the head mechanism 2, an index sensor 6 for sensing the initial position of the floppy disc 11, an on/off switch 7 for turning on upon engagement with a lock lever 10 are assembled onto the chassis 1 respectively.

A lamp 8 being lit up a overall control circuit and write circuit section 20 during operation of the floppy disc drive apparatus is assembled onto the chassis 1.

A front panel 9 for inserting the floppy disc 11, a drive motor 12 being rotated controllably under control of a motor drive circuit section 23 are assembled onto the chassis 1 respectively.

A control circuit section 16 mounted on a printed wiring board 17 for executing various types of control and signal processing having a card edge terminal for system connection 18 connected to a system for transmitting signals to and from the system, a power socket 19 for receiving DC power source are assembled onto the chassis 1 respectively.

A head switching circuit and reproduction circuit section 21 for selective amplification, differentiation as well as digitization of the data recorded on the floppy disc 11, and a voltage switching circuit and driving circuit section 22 are assembled onto the chassis 1 respectively.

All of the parts thus arranged are assembled onto the chassis 1. DC power sources of +12 V and +5 V are connected to the power socket 19, and a signal cable led from a host system for controlling the floppy disc drive apparatus is connected to the card edge terminal for system connection 18 (hereinafter simply referred to as card edge terminal). With the connections thus established, the floppy disc drive apparatus is brought into an operable state.

The floppy disc 11 is inserted through a front insertion opening in the front panel 9, and then held by the drive motor 12 when the lock lever 10 is turned. The drive motor 12 is rotated at a constant speed under control of the motor drive circuit section 23, whereby the floppy disc 11 is also rotated at a constant speed.

The voltage switching circuit and driving circuit section 22 is adapted to operate the head load mechanism 4 to that the head mechanism 2 is pushed against a recording surface of the floppy disc 11. The voltage switching circuit and driving circuit section 22 also drives the stepping motor 3 so that the head mechanism 2 coupled with the stepping motor 3 is moved in the radial direction of the floppy disc 11.

After being initialized by means of the zero track sensor 5, the head mechanism 2 is moved to a radial desired position (track position). The circumferential position (sector position) of the floppy disc 11 is monitored by the index sensor 6 to sense the initial position thereof. And a circumferential desired position (sector position) is then searched from the initial position. When the desired position comes under the head mechanism 2, the read/write operation of data is started.

Data is written in such a manner that a train of data sent out of the host system (not shown) through the card edge terminal 18 is signal-processed by the overall control circuit and write circuit section 20, and then recorded on the floppy disc 11 by the head mechanism 2 through the head switching circuit and regeneration circuit section 21.

When reading, the data recorded on the floppy disc 11 is reproduced by the head mechanism 2, passed through the head switching circuit and reproduction circuit section 21 for selective amplification, differentiation as well as digitization, and thereafter sent out to the host system from the card edge terminal 19.

The on/off switch 7 is arranged to turn on upon engagement with the lock lever 10 when it is closed after insertion of the floppy disc 11. The on/off switch 7 serving to rotate the drive motor 12 for a certain time to thereby effect smooth holding of the floppy disc 11 when the floppy disc 11 is inserted. This operation is automatically performed by the overall control circuit and write circuit section 20 independently of the host system.

The lamp 8 is lit up by the overall control circuit and write circuit section 20 during operation of the floppy disc drive apparatus. A write protect sensor 25 is a sensor for detecting a write prohibit seal (not shown) stuck onto the floppy disc 11. Upon turn-on of the signal from the write protect sensor 25, the overall control circuit and write circuit section 20 electrically prohibits writing onto the floppy disc 11.

In the head mechanism 2, there is further an erase section (not shown) which serves to erase useless areas between the recording tracks and which requires on/off control by the overall control circuit and write circuit section 20 when writing.

Hereinafter, the control circuit section 16 according to the present invention will be described in detail.

The edge card terminal for system connection 18 transmits signals to and from the host system. The power socket 19 for receiving source power +12 V and +5 V to be employed from the floppy disc drive apparatus.

A capacitor C1 and a resistor R1 constitute a so-called CR circuit for FG (function generator), which connects the chassis 1 with a ground terminal of the source power.

A short plug assembly 26 is employed to set the unit number of the floppy disc drive apparatus (for drive selection) and operating conditions of the head load mechanism 4. A terminator 27 serves as a termination resistor for an interface cable connected to the card edge terminal 18.

A test terminal 28 checks signals from the zero track sensor 5 and the index sensor 6. A test terminal 29 checks a reproduced output of the head switching circuit and reproduction circuit section 21.

A hybrid integrated circuit 30 includes a drive circuit for the lamp 8, a logic circuit for determining operating conditions of the head load mechanism 4, as well as a logic circuit for gating a reproduced digital output (read data) from the head switching circuit and reproduction circuit section 21.

The overall control circuit and write circuit section 20 is formed in the form of a semiconductor integrated circuit 20a. The overall control circuit and write circuit section 20 comprises a sequence logic circuit for performing the controls, a timing logic circuit, a write circuit for passing a write current to the head mechanism 2, an erase circuit for passing an erase current to the erase section, a source power reset circuit for resetting at the time of rising and falling of the source power, and a phase sequence signal generating circuit for driving the stepping motor 3.

In the surrounding of the overall control circuit and write circuit section 20, a resistor and a capacitor for a time constant of the timing circuit as well as resistors for limiting the write current and the erase current are all arranged and connected with each other.

The head switching and reproduction circuit section 21 mainly comprises a hybrid integrated circuit 21a in which there are integrated a head switching circuit adapted to switch heads housed in the head mechanism 2 from one to another, or vice versa, corresponding to the back side (side 0) or the front side (side 1) of the floppy disc 11, and a reproduction circuit adapted to amplify, filter and differentiate a reproduced signal from the head mechanism 2 and then convert it to digital pulses by a comparison circuit to thereby provide read data.

In the surrounding of the head switching and reproduction circuit section 21, a semi-fixed resistor and a resistor for adjusting an offset of the reproduction circuit are arranged and connected with each other.

The voltage switching circuit and drive circuit section 22 comprises a stepper driver 22a for driving the stepping motor 3 upon reception of a phase sequence signal generated from the semiconductor integrated circuit 20a, a hybrid integrated circuit 22b composed of a solenoid driver for driving the head load mechanism 4 and a circuit for turning the source power of +12 V on/off out of a power save circuit adapted to switch the voltage applied to both the head load mechanism 4 and the stepping motor 3 between +12 V during operation and +5 V during holding, for the purpose of power saving, and a diode D2 for switching supply of the source power of +5 V from the power save circuit.

The motor drive circuit section 23 adapts to controllably rotate the drive motor 12 at a constant speed 12.

The motor drive circuit section 23 mainly comprises a control semiconductor integrated circuit 23a including an amplification circuit for processing a speed detection signal, a comparator, a sawtooth wave generating circuit for setting the speed, a sample/hold ciruit for comparing the differences between the speed detectioon signals and the setting signal, as well as a mixing applification circuit, and a semiconductor integrated circuit 23b including an amplification circuit for amplifyingthe signal from a Hall element (incorporated in the drive motor 12) to obtain an excitation phase switching signal for motor driving, a logic circuit for switching the excitation phase of the drive motor 12 in response to an output signal from the amplification circuit, an output amplification circuit, as well as a control amplification circuit for controlling the speed upon reception of a speed control signal.

In the vicinity of the motor drive circuit 23, a feedback resistor, a resistor and a capacitor for a time constant, a noise bypassing capacitor, a current limiting resistor, a surge absorbing resistor and capacitor, etc. to be connected with the foregoing circuits are arranged and connected with each other.

A connector J03 is a connector for connection of lead wires of the head mechanism 2. A connector J04 is a connector for connection of lead wires of the index sensor 6, on/off switch 7 and the head load mechanism 4. And D1 is a diode for absorbing a voltage spike occurring when the head load mechanism 4 is turned on/off. A connector J05 is a connector for connection of lead wires of the stepping motor 3. And a connector J06 is a connector for connection of lead wires of the lamp 8.

A lead wire 31 from the zero track sensor 5 is directly attached to the printed wiring board 17.

The control circuit section 16 is constituted as mentioned above and all mounted on the printed wiring board 17 which is formed of a single printed wiring board.

The card edge terminal 18 and the power socket 19 constitute the part for connection with the exterior. Therefore, the card edge terminal is disposed at the end of the board 17 juxtaposed with the stepping motor 3 in opposite relation to the front panel 9, i.e., in the rear end portion of the floppy disc driver, from the standpoints of handling, operability and configuration of the floppy disc drive apparatus.

The connectors J03, J04, J05 and J06 are disposed in the peripheral end portions of the printed wiring board 17 from the reasons of minimizing the length of each of lead wires extending from the respective parts, exhibiting satisfactory operation and improving the efficiency of parts on the printed wiring board 17.

More specifically, the connector J03 is disposed in the board end portion on the side of a through hole 1a because the lead wires 2a of the head mechanism 2 are laid passing the through hole 1a formed in the chassis 1.

The connector J04 is disposed in the board end portion near a guide hole 1b because the lead wires from the index sensor 6, on/off switch 7 and the head load mechanism 4 are laid together through the guide hole 1b formed in the chassis 1.

The connector J05 is disposed inthe board end portion near the stepping motor 3 for direct connection of the lead wires of the stepping motor 3. And the connector J06 is disposed in the board end portion near a guide hole 1c because the lead wires of the lamp 8 are laid through the guide hole 1c formed in the chassis 1.

In the printed wiring board 17 thus arranged, the overall control circuit and write circuit section 20 has a function of receiving an input signal from the card edge terminal 18 to control the respective sections as well as receiving signals from the respective sensors to output them to the card edge terminal 18.

And the overall control circuit and write circuit section 20 also has another function of sending the write data input from the card edge terminal 18 to the head mechanism 2 through the head switching circuit and reproduction circuit section 21 for writing.

Thus, with the overall control circuit and write circuit section 20 disposed between the card edge terminal 18 and the head switching circuit and write circuit section 21, the efficiency of wiring is improved and the length of wiring is shortened, thus resulting in a configuration highly resistant to noise.

Meanwhile, the head switching circuit and reproduction circuit section 21 functions to amplify and process a very feeble signal from the head mechanism 2. Thus, with the head switching circuit and reproduction circuit section 21 disposed very close to the connector J03 and spaced from other circuit sections, the noise resistance is increased and the reliability is improved.

The motor drive circuit section 23 serves to controllably drive the drive motor 12, whereby it is preferably disposed near the drive motor 12 from the standpoint of wiring. Furthermore, because the motor drive circuit section 23 generates the driving spike noise while the drive motor 12 is driven, it must be disposed remote from other circuit sections, particularly from the circuit section which handles signals.

The voltage switching circuit and driving circuit section 22 is in a hold state and generates no noise while the data is written/read with respect to the floppy disc 11. Therefore, the location of the voltage switching circuit and driving circuit section 22 is relatively free.

But, from the standpoint of wiring, it is preferable for the voltage switching circuit and driving circuit section 22 to be disposed near the connector J05 for the stepping motor 3, with the result that the length of wiring is shortened and reliability is improved.

From the above reasons, the overall control circuit and write circuit section 20 as well as the head switching circuit and reproduction circuit section 21 are disposed in an area defined by the drive motor 12, the card edge terminal 18 and the power socket 19.

And also the overall control circuit and write circuit section 20 and the head switching circuit and reproduction circuit section 21 are disposed in successive relation, with the head switching circuit and reproduction circuit section 21 disposed adjacent, to the connector J03.

The motor drive circuit section 23 is required to be remote from the above two overall control circuit and write circuit section 20 and head switching circuit and reproduction circuit section 21.

And hence the motor drive circuit section 23 is disposed on the side opposite to the above two circuit sections 20, 21 with the drive motor 12 therebetween, i.e., in an area defined between the drive motor 12 and the front panel 9.

The stepping motor 3 and the head load mechanism 4 are both in a hold state during the time when the head mechanism 2 reads/writes data. Thus, the voltage switching circuit and driving circuit section 22 generates no switching noise.

However, the voltage switching circuit and driving circuit section 22 is of a power circuit and hence includes a power line, whereby noise is liable to occur accordingly. From this reason, the voltage switching circuit and driving circuit section 22 is preferably disposed to be remote from the head switching circuit and reproduction circuit section 21.

Therefore, the voltage switching circuit and driving circuit section 22 is located between the drive motor 12 and the stepping motor 3 on the side opposite to the connector J03. With the constitution thus arranged, the length of wiring and laying is shortened and both the reliability and the operability of the control circuit section 16 can be improved.

What is claimed is:

1. In a floppy disc drive apparatus comprising; a drive motor for driving a floppy disc; a head mechanism for reading/writing data; a stepping motor for moving said head mechanism; a card edge terminal connected to a system for transmitting signals to and from the system; a power socket for receiving source power; a connector for connecting lead wires of said head mechanism; a control circuit section for executing various types of control and signal processing; a printed wiring board, said control circuit section, said card edge terminal, said power socket and said connector being located on said printed wiring board, said control circuit section including therein an overall control circuit and write circuit section, a head switching circuit and reproduction circuit section, and a motor drive circuit section; and said overall control circuit and write section, said head switching circuit and reproduction circuit section and said motor drive circuit section are mounted on said printed wiring board formed of a single printed wiring board, wherein said drive motor is installed on said single printed wiring board, said motor drive circuit section is disposed in opposite relation to said overall control circuit and write circuit section and said head switching circuit and reproduction circuit section with said drive motor therebetween to increase noise resistance in the control circuit section, and said overall control circuit and write circuit section and said head switching circuit and reproduction circuit section are disposed between said drive motor and said card edge terminal.

2. The floppy disc drive apparatus according the claim 1, wherein said overall control circuit and write circuit section and said head switching circuit and reproduction circuit are disposed in successive relation.

3. The floppy disc drive apparatus according to claim 2, wherein said head switching circuit and reproduction circuit section is disposed adjacent to said connector for connecting lead wires of said head mechanism.

4. In a floppy disc drive apparatus comprising: a drive motor for driving a floppy disc; a head mechanism for reading/writing data; a stepping motor for moving said head mechansim; a card edge terminal connected to a system for transmitting signals to and from the system; a power socket for receiving source power; a connector for connecting lead wires of said head mechanism; a control circuit section for executing various types of control and signal processing; a printed wiring board mounting thereon said control circuit section, said card edge terminal, said power socket and said connector, said control circuit section including therein an overall control circuit and write circuit section, a head switching circuit and reproduction circuit section, a motor drive circuit section; and said overall control circuit and write circuit section, said head switching circuit and reproduction circuit section and said motor drive circuit section are mounted on said printed wiring board formed of a single printed wiring board, wherein said drive motor is installed on said single printed wiring board, and said motor drive circuit section is disposed in opposite relation to said overall control circuit and write circuit section and said head switching circuit and reproduction circuit section with said drive motor therebetween, said overall control circuit and write circuit section and said head switching circuit and reproduction circuit section are disposed in successive relation with said head switching circuit and reproduction circuit section disposed adjacent to said connector for connecting lead wires of said head mechanism, said card edge terminal and said power socket are disposed, respectively, at an end of said single printed wiring board juxtaposed with said stepping motor, and said overall control circuit and write circuit section and said head switching circuit and reproduction circuit section are disposed adjacent to said card edge terminal and said power socket.

5. The floppy disc drive apparatus according to claim 4, wherein a voltage switching circuit and driving circuit section for pushing said head mechanism against a recording surface of said floppy disc and for driving said stepping motor is mounted on said single printed wiring board, and said voltage switching circuit and driving circuit section is located between said drive motor and said stepping motor.

6. The floppy disc drive apparatus according to claim 4, wherein said overall circuit and write circuit section comprises a sequence logic circuit for performing the controls, a timing logic circuit, a write circuit for passing a write current to said head mechanism, an erase circuit for passing an erase current to an erase section, a source power reset circuit for resetting at the time of rising and falling of said power socket, and a phase sequence signal generating circuit for driving said stepping motor.

7. The floppy disc drive apparatus according to claim 6, wherein said overall control circuit and write circuit section includes further, in a surrounding portion of said overall control circuit and write circuit section, a resistor and a capacitor for a time constant of said timing logic circuit, and resistors for limiting the write current and the erase current being connected with each other.

8. The floppy disc drive apparatus according to claim 4, wherein said head switching circuit and reproduction circuit section comprises a hybrid integrated circuit in which there are integrated a head switching circuit adapted to switch heads housed in said head mechanism from one to another and a reproduction circuit adapted to amplify, filter and differentiate a reproduced signal from said head mechanism and then convert it to digital pulses by a comparison circuit to thereby provide a read data.

9. The floppy disc drive apparatus according to claim 8, wherein said head switching circuit and reproduction circuit section includes further, in a surrouding portion of said head switching circuit and reproduction circuit section, a semi-fixed resistor and a resistor for adjusting an offset of the reproduction circuit being connected with each other.

10. The floppy disc drive apparatus according to claim 4, wherein said motor drive circuit section comprises a control semiconductor integrated circuit including an amplification circuit for processing a speed detection signal, a compacitor, a sawtooth wave generating circuit for setting the speed, a sample/hold circuit for comparing the differences between the speed detection signals and the setting signal, a mixing amplification circuit, and a semiconductor integrated circuit including an amplification circuit for amplifying the signal from a Hall element to obtain an excitation phase switching signal for motor driving, a logic circuit for switching the excitation phase of said drive motor in response to an output signal from said amplification circuit, an output amplification circuit and a control amplification circuit for controlling the speed upon reception of a speed control signal.

11. The floppy disc drive apparatus according to claim 10, wherein said motor drive circuit section includes further, in a surrounding portion of said motor drive circuit section, a feed-back resistor, a resistor and a capacitor for a time constant, a noise bypassing capacitor, a current limiting resistor, a surge absorbing resistor and capacitor to be connected with the foregoing circuits being connected with each other.

* * * * *